United States Patent
Hamilton et al.

(10) Patent No.: US 6,240,294 B1
(45) Date of Patent: May 29, 2001

(54) MOBILE RADIO DEVICE HAVING ADAPTIVE POSITION TRANSMITTING CAPABILITIES

(75) Inventors: Bradley J. Hamilton; William E. Rodgers, both of Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 08/866,166

(22) Filed: May 30, 1997

(51) Int. Cl.$^7$ .................................................. H04Q 7/20
(52) U.S. Cl. ............................................ 455/456; 342/357
(58) Field of Search ..................... 455/456, 457, 455/432, 433; 340/992; 342/357; 701/207

(56) References Cited

U.S. PATENT DOCUMENTS

| | | | |
|---|---|---|---|
| 3,899,671 | * | 8/1975 | Stover .................................. 455/524 |
| 5,629,710 | * | 5/1997 | Sawada ................................ 455/456 |
| 5,666,662 | * | 9/1997 | Shibuya ............................... 455/456 |

* cited by examiner

*Primary Examiner*—Nguyen Vo
*Assistant Examiner*—Sam Bhattacharya
(74) *Attorney, Agent, or Firm*—Saul Elbaum, Esq.

(57) ABSTRACT

An Adaptive Position Transmission Algorithm (APTA) for mobile radio device where position information is required, using any transmission medium such as high frequency (HF), very high frequency (VHF), ultra high frequency (UHF), Satellite Communications (SATCOM), etc. A mobile radio device employing the APTA provides accurate and automatic position reporting and thus, in a tactical environment improves situation awareness and reduces the probability of fratricide. A mobile radio device employing the APTA also reduces the number of options available to the user thereby simplifying the operation thereof while improving overall performance in most applications. The APTA accomplishes this by monitoring position, time and radio network parameters to determine when stand alone messages will be transmitted. The APTA factors radio network loading with movement and periodic thresholds. As radio network loading increases, the movement and periodic thresholds are increased to reduce the impact of position reporting on the radio network. The APTA also incorporates a time limit which prevents the radio from transmitting too often. This time limit is based on radio network loading.

26 Claims, 2 Drawing Sheets

| GPS MODE FRONT PANEL INDICATION | FUNCTION |
| --- | --- |
| OFF | GPS POSITION REPORTING DISABLED. NO POSITION INFORMATION IN MESSAGES. |
| AUTO | POSITION INFORMATION IN VOICE AND DATA MESSAGES ONLY. NO STAND-ALONE MESSAGES. |
| MOV | POSITION INFORMATION IN VOICE AND DATA MESSAGES PLUS STAND-ALONE MESSAGES EVERY 100 METERS (MANPACK) OR 300 METERS (VEHICULAR). |
| PER | POSITION INFORMATION IN VOICE AND DATA MESSAGES PLUS STAND-ALONE MESSAGES EVERY TWO-MINUTES. |

FIG.1
(PRIOR ART)

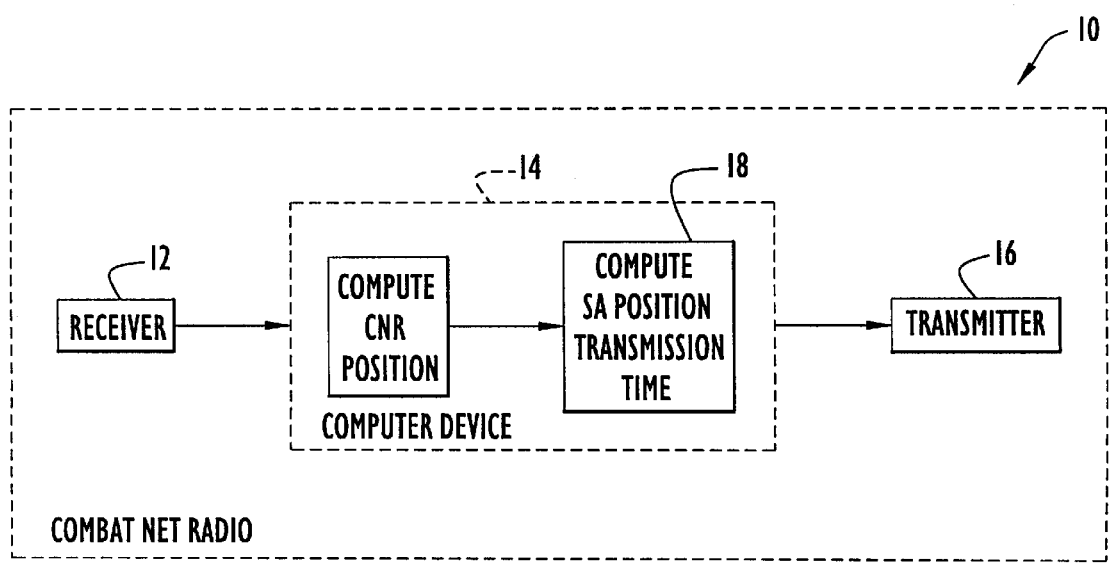

FIG.2

MOBILE RADIO DEVICE HAVING ADAPTIVE POSITION TRANSMITTING CAPABILITIES

FIELD OF THE INVENTION

The present invention relates to radio communication and more particularly to a method for enabling a mobile radio device to automatically transmit position messages based on user position, time and network parameters.

BACKGROUND OF THE INVENTION

Global Positioning Satellite (GPS) navigation as exemplified by NAVSTAR/GPS, is an accurate, three-dimensional navigation system which has become one of the most important technologies of the era, impacting a myriad of users from aircraft and ships, to farmers and hikers. The GPS comprises a constellation of twenty four satellites and three spares which orbit the earth twice a day. The orbits of the GPS satellites are maintained in a virtually circular manner at approximately 10,898 nautical miles above the earth, the GPS satellites orbiting the earth in six overlapping orbital planes based on the equatorial plane of the earth. These orbits are chosen so that the GPS system can provide information to users regardless of the time that the user requests information and regardless of the user's position on the earth's surface. This information contains a navigation message, which includes satellite ephemerides and satellite clock drift information.

Accordingly, the Global Positioning System (GPS) enables user position information to be easily and automatically transmitted in voice and data messages to support situation awareness (SA) in military tactical environments using for example, a United States (US) Army, Single Channel Ground-Airborne Radio System (SINCGARS) Combat Net Radio (CNR). The SINCGARS is a frequency hopping radio network system that hops over the 30–88 MHZ band, with 25 kHz frequency spacing and thus, enables GPS-based range measurements to be made even while transmitting. For more information, see Robert C. Dixon, *Spread Spectrum Systems* (second edition, 1984). The existing US Army CNR provides GPS user position information, attached to voice and data messages and employs user position transmitting techniques which initiate stand-alone SA GPS position messages based on user movement or elapsed time so that position updates are not totally dependent on voice or data transmissions.

The SA GPS position messages are initiated by the existing US Army CNR in two different user-selectable modes of operation. The first mode of operation is based on radio movement (referred to as the "movement" mode), where a SA message is sent when the CNR has moved either 100 meters (manpack configuration) or 300 meters (vehicular configuration). The second mode of operation is based on elapsed time (referred to as the "periodic" mode), where a SA message is sent every two minutes. The radio operator can select either mode of operation (but not both) from the front panel of the CNR. In addition, the radio operator can turn the GPS function off or set the CNR to send position information only attached to voice and data messages but not as a stand alone SA message (AUTO position). The GPS mode front panel indications and corresponding functions for a prior art CNR are shown in FIG. 1.

There are several problems associated with the US Army implementation of the SA position message reporting in the "movement" and "periodic" modes of operation. In the "movement" mode of operation, the first problem associated therewith relates to the decreasing number of automatic position updates which occur as the CNR moves slower. When the CNR is in the "movement" mode, there are no stand alone SA position messages generated when the CNR is stationary. That is, if the person or vehicle carrying the CNR is not moving for any period of time, there will be no SA position messages generated by the CNR. If voice and data messages are not being sent on a regular basis, and the CNR is not moving, the user's position will not be sent.

The second problem associated with the "movement" mode of operation is that the faster the vehicle is moving, the more often the automatic position updates are generated. Since the movement threshold is set to 300 meters, vehicles moving at a faster rate of speed will generate SA position messages at an excessively quick rate. For example, vehicles traveling over 30 mph will generate SA position messages faster than once every 15 seconds. This can severely impact SINCGARS (radio net or radio network) loading; especially when multiple vehicles are moving in formation at a fast rate.

In the "periodic" mode of operation the problem associated therewith is that the accuracy of the position reporting becomes significantly less as the CNR moves faster. When the CNR is in the "periodic" mode, SA position messages are sent every two minutes. When a vehicle is moving rapidly, the distance between position updates can become large. For example, a vehicle traveling 25 miles per hour will transmit periodic position updates over 1.3 km apart. At 40 miles per hour, the distance between SA position messages will be greater than 2 km.

Accordingly, an object of the present invention is to provide a method for reducing the number of operating options available to a user of mobile radio device in order to simplify the operation of the device and improve the overall performance of the device in most of its applications.

Another object of the present invention is to provide a mobile radio device which employs the above method.

SUMMARY

A method for automatically transmitting position messages across a radio network with a mobile radio device. One aspect of the method comprises the steps of initiating the start of a predetermined time limit, resetting a predetermined periodic time interval, setting a movement starting point which is equal to the radio device's current position, determining whether a position message in voice and data has been transmitted, and repeating the initiating, resetting, setting, and determining steps when a position message in voice and data has been transmitted.

Another aspect of the present invention comprises the steps of determining whether a stand alone position message was transmitted within the predetermined time limit when a position message in voice and data has not been transmitted and restarting the predetermined time limit when a stand alone position message has been transmitted.

A further aspect of the present invention comprises the steps of determining whether the periodic time interval has expired when a stand alone position message has not been transmitted within the predetermined time limit and transmitting a stand alone position message from the radio device which identifies the radio device's new current position when the predetermined periodic time interval has expired.

Still a further aspect of the present invention comprises the steps of restarting the predetermined time limit, resetting the predetermined periodic time interval, and resetting the movement starting point in accordance with the radio device's new current position.

In still another aspect of the present invention there comprises the steps of determining whether the radio device's distance from the movement starting point has achieved a predetermined distance threshold when the predetermined periodic time interval has not expired and transmitting a stand alone position message from the radio device which identifies the radio device's new current position when the distance from the movement starting point achieves the predetermined distance threshold.

A further aspect of the present invention comprises the step of restarting the predetermined time limit when the distance from the movement starting point is less than the predetermined distance threshold.

Another aspect of the present invention involves the step of initiating which includes starting a predetermined time period and further comprising the step of checking whether the predetermined time period has lapsed.

Still another aspect of the present invention relates to the step of determining whether a position message in voice and data has been transmitted, which is performed when the predetermined time period has not lapsed and the step of repeating includes repeating the checking step.

In still another aspect of the present invention, there comprises the step of measuring radio network activity over the predetermined time period when the predetermined time period has lapsed, to determine idle time on the radio network.

A further aspect of the present invention involves when the mobile radio device has one of at least two structural configurations and further comprising the steps of determining which of the at least two structural configurations the radio device is in and selectively increasing the predetermined distance threshold, the predetermined time limit and the predetermined periodic time interval in accordance with the determined one of the two structural configurations when the idle time on the radio network is less than a predetermined value.

Another aspect of the present invention includes a mobile radio device which performs the above described method.

BRIEF DESCRIPTION OF THE DRAWINGS

For a detailed understanding of the present invention, reference should be made to the following detailed description taken in conjunction with the accompanying drawings wherein:

FIG. 1 depicts the GPS mode front panel indications and corresponding functions for a prior art CNR;

FIG. 2 is a block diagram of an exemplary CNR employing the Adaptive Position Transmission Algorithm of the present invention.

DETAILED DESCRIPTION OF THE INVENTION

Figure 3:
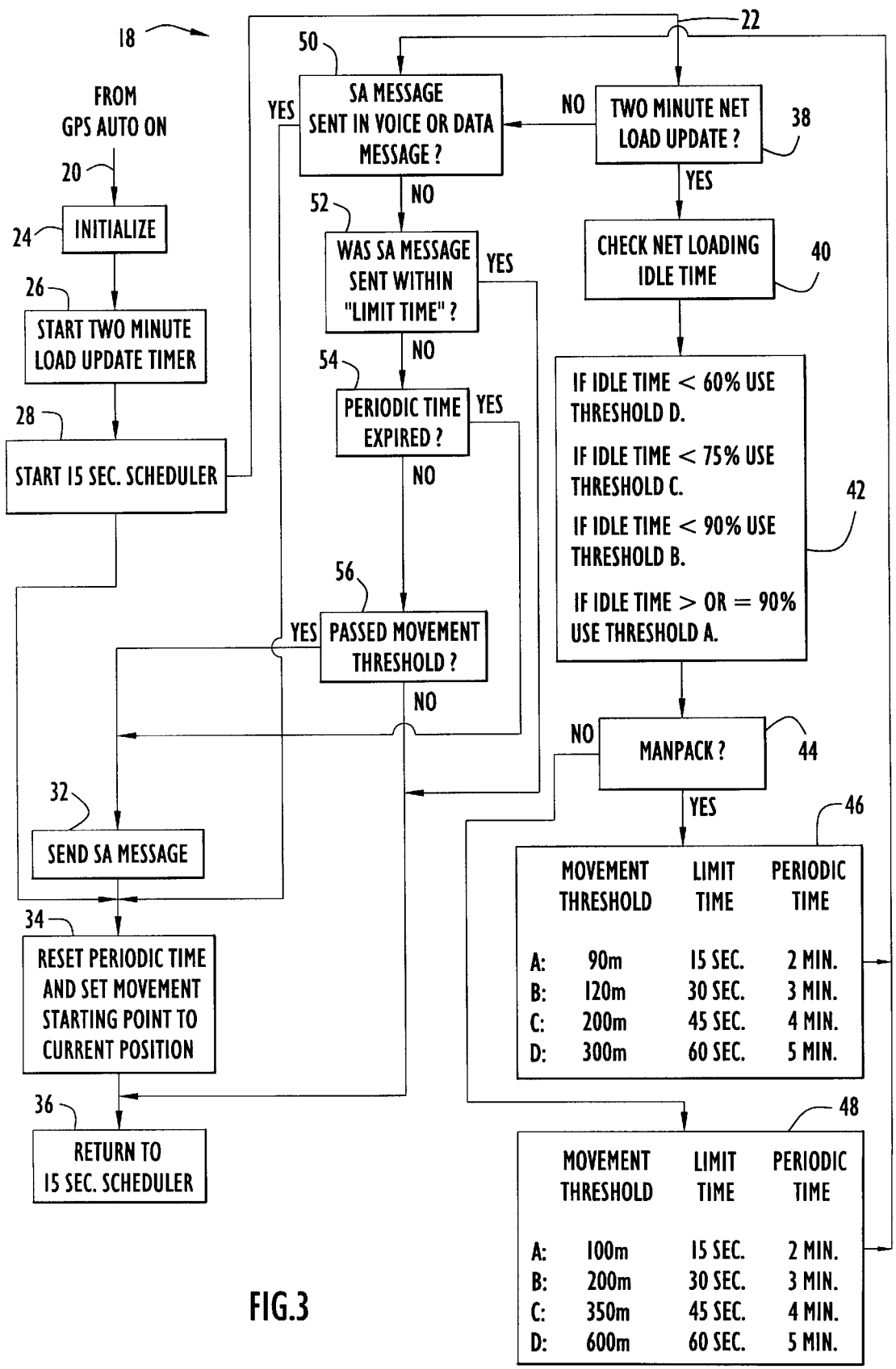
FIG. 3 is a flowchart of the Adaptive Position Transmission Algorithm of the present invention.

The present invention is directed to an Adaptive Position Transmission Algorithm (APTA) which has application in almost any mobile radio device where position information is required, using any transmission medium such as high frequency (HF), very high frequency (VHF), ultra high frequency (UHF), Satellite Communications (SATCOM), etc. The APTA of the present invention is especially useful in its application to a United States (US) Army, Single Channel Ground-Airborne Radio System (SINCGARS) Combat Net Radio (CNR) since a CNR employing the APTA of the present invention provides accurate and automatic position reporting and thus, in a tactical environment improves situation awareness and reduces the probability of fratricide. Accordingly the APTA of the present invention will be described in its application to a CNR.

As will be described further on, a CNR or other similar mobile radio device employing the APTA of the present invention is substantially simpler to operate than existing CNRs as earlier described. This is because the APTA enables the CNR to provide only one mode of operation for generating and transmitting stand-alone (SA) position messages. In addition, improvements in reporting performance and more efficient use of the radio net are achieved, since the APTA utilizes factors other than just movement or elapsed time. Consequently, a CNR or other mobile radio device employing the APTA of the present invention has a reduced number of options available to the user thereby simplifying the operation thereof while improving overall performance in most applications.

Referring to FIG. 2, a CNR employing the APTA of present invention is denoted by numeral 10. The CNR 10 is conventionally configured in terms of hardware and thus, comprises a receiver 12 for receiving navigation data from the GPS or like satellite navigation system and a transmitter 16 for transmitting the position of the CNR 10. The CNR also includes a computing device 14 such as a microprocessor, that calculates the position of the CNR 10 using the navigation data received by the receiver 12 from the GPS and executes the APTA 18 which monitors position, time, and net parameters to determine when SA position messages will be transmitted by the transmitter 16 of the CNR 10 as will be further explained. The construction and operation of such hardware in a CNR are well known in the art and therefore, needn't be described here any further. It is also well known in the art that the CNR 10 can be provided in a manpack configuration that allows the CNR 10 to be attached to a user's back, in a vehicular configuration that allows the CNR 10 to be mounted in a vehicle such as a Jeep or tank, in a hand-held configuration that allows the CNR 10 to be hand-held, or in a airborne configuration that allows the CNR 10 to be mounted in an airplane.

The APTA 18 of the present invention enables the CNR 10 to achieve the objectives of simplified operation and improved overall performance, by factoring net loading with movement and periodic thresholds. As net loading increases, the movement and periodic thresholds are increased to reduce the impact of position reporting on the net. In addition, a time limit is incorporated which prevents the CNR 10 from transmitting too often. This time limit is also set based on net loading.

The APTA 18 provides many advantages over the "movement" and "periodic" position transmitting algorithms of existing CNRs. For example, SA position messages are sent periodically by the present CNR 10, even when the user (manpack configuration) or vehicle (vehicular configuration) is stationary. In the case of vehicular configuration, as the vehicle speed increases, the present CNR 10 employing the APTA 18, limits the number of SA position messages transmitted. Further, as net loading increases, both movement and periodic thresholds are increased to minimize the impact to the net.

Existing CNRs automatically transmit GPS SA messages based on radio configuration (manpack or vehicular), movement, time since last position update (elapsed time), and radio net loading. The APTA 18 provides timely and accurate position information, while minimizing the impact to radio net loading. The APA 18 is enabled when the CNR 10 is placed in the GPS AUTO mode of operation. This allows the MOV and PER modes shown in FIG. 1 to be eliminated if desired.

Referring now to FIG. 3, a flowchart depicting an embodiment of the APTA 18 of the present invention is shown. The APTA 18 is based on a 15 second scheduler (SA Scheduler) shown in block 28 that tests system parameters every 15 seconds to identify whether GPS SA position messages should be sent. The SA position messages are sent when the dynamic thresholds of these parameters are met.

There are two entry points into the APTA 18. The first entry point 20 is from operator selection of the GPS AUTO mode of operation. When the GPS AUTO mode of the CNR 10 of the present invention is first selected, the GPS and APTA system parameters are initialized in block 24. The APTA 18 relies on multiple users entering the GPS AUTO mode at different times, thereby creating a "randomized" start to prevent CNRs in a net from attempting to transmit SA position messages at the same time. The second entry point 22 is from the SA Scheduler of block 28 during operation of the CNR after the APTA 18 has been enabled.

The APTA 18 uses the following system parameters shown in block 34 to provide adaptive position transmission capabilities to the CNR 10. These system parameters comprise "idle time," "limit time," "movement starting point," "movement threshold," and "periodic time." In order to fully understand the operation of the APTA 18, these system parameters are defined immediately below.

The system parameter referred to herein as "idle time" is the percentage of time of no net activity during a two minute period time. The CNR 10 measures net activity and determines the amount of idle time on the net. The idle time data obtained by the CNR 10 is processed by the APTA 18 to determine the values for movement threshold, limit time, and periodic time.

The system parameter referred to herein as "limit time" is the minimum time between transmitted SA position messages or the minimum time between a user initiated voice or data message with attached SA position message and a stand alone SA message. Limit time data is generated by the APTA 18 and is used by the APTA 18 to set a limit on the transmission rate of SA position messages. The APTA 18 sets the limit time to a minimum of 15 seconds and is dependent on other parameters as will be explained further on.

The system parameter referred to herein as "movement starting point" is the GPS position of the last transmitted SA position message. The movement starting point is used as the stating position for determining the movement distance. Upon initialization, this parameter is set to the current GPS position.

The system parameter referred to herein as "movement threshold" is the distance set for transmitting SA position messages. When the distance between a current user's position and the last SA position message (the movement starting point) is greater than the movement threshold, the APTA 18 initiates a SA position message.

The system parameter referred to herein as "periodic time" is the time set for transmitting SA position messages. When the periodic time is reached, a SA position message is transmitted. The periodic time is set to a minimum of two minutes and is dependent on other parameters.

Referring still to FIG. 3, APTA initialization of block 24 commences when the GPS AUTO mode of the CNR 10 is selected. Each time the GPS AUTO mode of the CNR 10 is selected, the APTA 18 is enabled and the system parameters of block 34 are set to the default values shown in Table 1 below.

TABLE 1

APTA System Parameter Default Values

| APTA SYSTEM PARAMETER | DEFAULT VALUE |
|---|---|
| Idle Time | 90% |
| Limit Time | Threshold A |
| Movement Starting Point | Current GPS Position |
| Movement Threshold | Threshold A |
| Periodic Time | 2 minutes |

Enabling the GPS AUTO mode of the CNR 10 and thus, the APTA 18 also activates the SA Scheduler of block 28 and a two-minute update timer of block 26. The SA Scheduler 28 and the two-minute timer 26 create "random" transmission timers for each CNR in the net for the purpose of randomizing in time the generation of SA messages on the net. In addition, initialization will set the current position as the movement starting point.

The first SA position message is transmitted by the CNR 10 when the criteria for the APTA 18 are met. No SA position message will be transmitted prior to that time.

The SA Scheduler 28 ensures that the APTA 18 is performed approximately every 15 seconds. At the start of each pass through the APTA 18, the APTA 18 checks in block 38 whether the two minute Net Load Update timer 26 has expired. If the two minute Net Load. Update timer 26 has expired the Net Loading Idle Time is determined in block 40. Accordingly, the APTA checks Idle Time every two minutes. In block 42, whenever the total net "on-air" activity time reaches 10% of the two minute measurement interval (less than 90% Idle Time), SA position message reporting thresholds (both movement and periodic) are increased to lower SA position message traffic on the net. The SA position message reporting thresholds in block 42 are progressively increased at 25% and 40% activity levels. The SA position message reporting thresholds are dependent on the CNR's configuration. The APTA 18 determines in block 44 whether the CNR configuration is manpack. If the CNR configuration is manpack, the SA position message reporting thresholds are set in block 46 for a CNR in a manpack configuration. The manpack configuration thresholds are shown in Table 2 below.

TABLE 2

Manpack Configuration Thresholds

| Idle Time | Movement Threshold | Limit Time | Periodic Time |
|---|---|---|---|
| ≧90% | 90 meters | 15 seconds | 2 minutes |
| <90% | 120 meters | 30 seconds | 3 minutes |
| <75% | 200 meters | 45 seconds | 4 minutes |
| <60% | 300 meters | 60 seconds | 5 minutes |

If the APTA 18 determines in block 44 that the CNR configuration is not manpack, the SA position message reporting thresholds are set in block 48 for a CNR in a vehicular configuration. The vehicular configuration thresholds are shown in Table 3 below.

TABLE 3

Vehicular Configuration Thresholds

| Idle Time | Movement Threshold | Limit Time | Periodic Time |
| --- | --- | --- | --- |
| ≧90% | 100 meters | 15 seconds | 2 minutes |
| <90% | 200 meters | 30 seconds | 3 minutes |
| <75% | 350 meters | 45 seconds | 4 minutes |
| <60% | 600 meters | 60 seconds | 5 minutes |

After the APTA 18 sets the SA position message thresholds, or if it is not time to check net loading Idle Time (two minute Net Load Update of block 38 has not expired), the APTA 18 tests for any voice or data messages transmitted with SA position information in block 50. If a radio message has been transmitted with SA position information, the Periodic Time threshold will be reset and the current position will be entered as the Movement Starting Point in block 34.

If no messages with SA information have been transmitted in block 50, the APTA 18 will determine if the minimum Limit Time has been reached in block 52. If Limit Time has not been reached, the APTA 18 will return to the SA Scheduler 28 in block 36. If Limit Time has been reached in block 52, the APTA 18 checks whether the Periodic Time has expired in block 54. If Periodic Time has expired, a stand-alone SA message is transmitted in block 32 and then the Periodic Time is reset and the Movement Starting Point is set to the current position in block 34.

If the Periodic Time has not expired in block 54, the APTA 18 checks whether the Movement Threshold has been exceeded in block 56. If the Movement Threshold has been exceeded, a SA position message is transmitted in block 32 and then the Periodic Time is reset and the Movement Starting Point is set to the current position in block 34. If the Movement Threshold has not been exceeded in block 56, the APTA 18 at block 36, returns to the SA Scheduler 28. Or in other words, at the end of each pass, the APIA 18 always returns to the SA Scheduler 28.

As should now be apparent, a CNR controlled by the APTA of the present invention is capable of periodically transmitting SA position messages even when the CNR is stationary. Moreover, when an APTA controlled CNR is in the vehicular or airborne configuration, increasing vehicle or airplane speeds will not result in an excessive number of SA position messages since the APTA enables the CNR to automatically adapt the frequency of position reporting to the vehicle's/airplane's speed. Furthermore, an APTA controlled CNR is simpler to operate because it provides only one mode of operation for generating and transmitting SA position messages instead of two modes as in prior art CNRs. Additionally, as net loading increases, an APTA controlled CNR automatically adapts both the periodic and movement thresholds by increasing their values to minimize the impact on the net.

It should be apparent to one of ordinary skill in the art that the embodiment described herein is merely exemplary and that many variations and modifications to the embodiment can be made. For example, the APTA of the present invention can also be applied to mobile radios used in Identification of Friend or Foe (IFF), Command and Control, Personnel Recovery (Extraction) and Paramilitary/Civilian Radios. Any and all such variations or modifications as well as others which may become apparent to those skilled in the art, are intended to be included within the scope of the invention as defined by the appended claims.

What is claimed is:

1. A method for automatically transmitting position messages across a radio network with a mobile radio device, said method comprising the steps of:

initiating the start of a predetermined time limit;

resetting a predetermined periodic time interval;

setting a movement starting point which is equal to said radio device's current position;

determining whether a position message has been transmitted by said radio device with a voice or data message;

repeating said initiating, resetting, setting, and determining steps when a position message has been transmitted by said radio device with a voice or data message;

determining whether a stand alone position message was transmitted within said predetermined time limit when a position message with a voice or data message has not been transmitted; and restarting said predetermined time limit when a stand alone position message has been transmitted.

2. The method according to claim 1, further comprising the steps of:

determining whether said periodic time interval has expired when a stand alone position message has not been transmitted within said predetermined time limit and transmitting a stand alone position message from said radio device which identifies said radio device's new current position when said predetermined periodic time interval has expired.

3. The method according to claim 2, further comprising the steps of:

restarting said predetermined time limit;

resetting said predetermined periodic time interval; and resetting said movement starting point in accordance with said radio device's new current position.

4. The method according to claim 2, further comprising the steps of:

determining whether said radio device's distance from said movement starting point has achieved a predetermined distance threshold when said predetermined periodic time interval has not expired and transmitting a stand alone position message from said radio device which identifies said radio device's new current position when said distance from said movement starting point achieves said predetermined distance threshold.

5. The method according to claim 4, further comprising the step of restarting said predetermined time limit when said distance from said movement starting point is less than said predetermined distance threshold.

6. The method according to claim 4, further comprising the steps of:

restarting said predetermined time limit;

resetting said predetermined periodic time interval; and resetting said movement starting point in accordance with said radio device's new current position.

7. The method according to claim 1, wherein said step of initiating includes starting a predetermined time period and further comprising the step of checking whether said predetermined time period has lapsed.

8. The method according to claim 7, wherein said step of determining whether a position message has been transmitted with a voice or data message is performed when said predetermined time period has not lapsed and said step of repeating includes repeating said checking step.

9. The method according to claim 7, further comprising the step of measuring radio network activity over said predetermined time period when said predetermined time period has lapsed, to determine idle time on said radio network.

10. The method according to claim 9, wherein said mobile radio device has two structural configurations and further comprising the steps of:
    determining which of said two structural configurations said radio device is in and
    selectively increasing said predetermined distance threshold, said predetermined time limit and said predetermined periodic time interval in accordance with said determined one of said two structural configurations when said idle time on said radio network is less than a predetermined value.

11. The method according to claim 10, further comprising the steps of:
    determining whether a stand alone position message was transmitted within said predetermined time limit when a position message with a voice or data message has not been transmitted; and
    restarting said predetermined time limit when a stand alone position message has been transmitted.

12. The method according to claim 11, further comprising the steps of:
    determining whether said periodic time interval has expired when a stand alone position message has not been transmitted within said predetermined time limit and
    transmitting a stand alone position message from said radio device which identifies said radio device's new current position when said predetermined periodic time interval has expired.

13. The method according to claim 12, further comprising the steps of:
    restarting said predetermined time limit;
    resetting said predetermined periodic time interval; and
    resetting said movement starting point in accordance with said radio device's new current position.

14. The method according to claim 12, further comprising the steps of:
    determining whether said radio device's distance from said movement starting point has achieved a predetermined distance threshold when said predetermined periodic time interval has not expired and
    transmitting a stand alone position message from said radio device which identifies said radio device's new current position when said distance from said movement starting point achieves said predetermined distance threshold.

15. The method according to claim 14, further comprising the step of restarting said predetermined time limit when said distance from said movement starting point is less than said predetermined distance threshold.

16. The method according to claim 14, further comprising the steps of:
    restarting said predetermined time limit;
    resetting said predetermined periodic time interval; and
    resetting said movement starting point in accordance with said radio device's new current position.

17. A mobile radio device for automatically transmitting position messages across a radio network, said mobile radio device comprising:
    receiver means for receiving navigation data;
    scheduler means for initiating the start of a predetermined time limit;
    periodic means for resetting a predetermined periodic time interval;
    movement threshold means for setting a movement starting point which is equal to said radio device's current position;
    means for determining whether a position message has been transmitted with a voice or data message;
    transmitter means for transmitting position messages with voice or data messages and stand alone position messages;
    means for determining whether a stand alone position message was transmitted within said predetermined time limit by said transmitter means when a position message with a voice or data message has not been transmitted; and
    means for causing said scheduler means to restart said predetermined time limit when a stand alone position message has been transmitted by said transmitter means.

18. The mobile radio device according to claim 17, further comprising:
    means for determining whether said periodic time interval has expired when a stand alone position message has not been transmitted within said predetermined time limit and
    means for causing said transmitter means to transmit a stand alone position message which identifies said radio device's new current position when said predetermined periodic time interval has expired.

19. The mobile radio device according to claim 18, further comprising means for causing said scheduler means to restart said predetermined time limit, for causing said periodic means to reset said predetermined periodic time interval; and for causing said movement threshold means to reset said movement staring point in accordance with said radio device's new current position.

20. The mobile radio device according to claim 18, further comprising:
    means for determining whether said radio device's distance from said movement starting point has achieved a predetermined distance threshold when said predetermined periodic time interval has not expired and
    means for causing said transmitter means to transmit a stand alone position message which identifies said radio device's new current position when said distance from said movement starting point achieves said predetermined distance threshold.

21. The mobile radio device according to claim 20, further comprising means for causing said scheduler means to restart said predetermined time limit when said distance from said movement starting point is less than said predetermined distance threshold.

22. The mobile radio device according to claim 17, wherein said schedules means includes means for starting a predetermined time period and further comprising means for checking whether said predetermined time period has lapsed.

23. The mobile radio device according to claim 22, wherein said means for determining whether a position message has been transmitted with a voice or data message is operative when said predetermined time period has not lapsed.

24. The mobile radio device according to claim 20, further comprising means for measuring radio network activity over said predetermined time period when said predetermined time period has lapsed, to determine idle time on said radio network.

25. The mobile radio device according to claim 24, wherein said mobile radio device is configured in one of a plurality of predetermined configurations and further comprising:

means for determining which of said plurality of predetermined configurations said radio device is in; and means for selectively increasing said predetermined distance threshold, said predetermined time limit and said predetermined periodic time interval in accordance with said one of said plurality of predetermined configurations when said idle time on said radio network is less than a predetermined value.

26. The mobile radio device according to claim 17, wherein said mobile radio device comprises a Combat Net Radio.

* * * * *